(12) United States Patent
McClendon

(10) Patent No.: US 12,039,592 B2
(45) Date of Patent: Jul. 16, 2024

(54) AUTOMATED RENTAL SYSTEMS AND METHODS

(71) Applicant: Kenneth McClendon, Huntsville, AL (US)

(72) Inventor: Kenneth McClendon, Huntsville, AL (US)

(*) Notice: Subject to any disclaimer, the term of this patent is extended or adjusted under 35 U.S.C. 154(b) by 376 days.

(21) Appl. No.: 17/513,257

(22) Filed: Oct. 28, 2021

(65) Prior Publication Data
US 2023/0138613 A1    May 4, 2023

(51) Int. Cl.
*G06Q 30/0645* (2023.01)
*G06Q 20/40* (2012.01)
(Continued)

(52) U.S. Cl.
CPC ... *G06Q 30/0645* (2013.01); *G06Q 20/40145* (2013.01); *G06Q 30/0283* (2013.01);
(Continued)

(58) Field of Classification Search
CPC ......... G06Q 30/0645; G06Q 20/40145; G06Q 30/0283; G06Q 20/18; G06Q 20/3223; G06V 40/172; G07C 9/00896; G07C 9/37; G07C 2009/00936; G07C 9/26; G07C 9/27; G07C 9/38; G07F 17/0057
See application file for complete search history.

(56) References Cited

U.S. PATENT DOCUMENTS

| | | | |
|---|---|---|---|
| 7,533,809 B1 * | 5/2009 | Robinson ............... | G07B 15/02 235/382 |
| 11,763,266 B2 * | 9/2023 | Ma ........................ | G06F 16/252 340/932.2 |

(Continued)

FOREIGN PATENT DOCUMENTS

| | | | | |
|---|---|---|---|---|
| AU | 2011265760 B2 * | 4/2015 | ............. | G06Q 30/06 |
| CA | 3049765 A1 * | 1/2021 | ............. | G07F 17/12 |

(Continued)

OTHER PUBLICATIONS

Anonymous "Peer-to-Peer Car Sharing Drawing Attention in Japan," Jiji Press English News Service, 2021 (Year: 2021).*
(Continued)

*Primary Examiner* — Gerardo Araque, Jr.
(74) *Attorney, Agent, or Firm* — Mathew L. Grell, Esq.; Grell & Watson Patent Attorneys

(57) ABSTRACT

A system has a computing device that displays a plurality of graphical user interfaces (GUIs), the GUIs designed to capture detailed data indicative of a renter of a vehicle. The system further has a processor that receives data from one of the plurality of GUIs indicative of the renter. Further, the processor provides a plurality of vehicles available for renting and receives a selection of one of the plurality of vehicles from the renter. Also, the processor opens a gate for the renter to a rental car location and directs the renter to a key box, unlocks the key box based upon comparing the renter's image captured at the rental car location to a picture previously received from the renter. The processor further opens the key box if the comparison indicates the renter at the rental car location is the same person who uploaded the picture previously.

10 Claims, 10 Drawing Sheets

(51) Int. Cl.
*G06Q 30/0283* (2023.01)
*G06V 40/16* (2022.01)
*G07C 9/00* (2020.01)
*G07C 9/37* (2020.01)

(52) U.S. Cl.
CPC ....... *G06V 40/172* (2022.01); *G07C 9/00896* (2013.01); *G07C 9/37* (2020.01); *G07C 2009/00936* (2013.01)

(56) References Cited

U.S. PATENT DOCUMENTS

| | | | | |
|---|---|---|---|---|
| 11,810,028 | B2 * | 11/2023 | Trelin | G06V 20/52 |
| 11,823,517 | B2 * | 11/2023 | Haci | H04N 7/181 |
| 11,829,458 | B2 * | 11/2023 | Zhou | G06V 40/70 |
| 11,908,258 | B2 * | 2/2024 | Klein | G16H 40/63 |
| 11,928,201 | B2 * | 3/2024 | Hoyer | H04W 12/069 |
| 11,935,114 | B2 * | 3/2024 | Metev | G06V 20/52 |
| 2007/0197261 | A1 * | 8/2007 | Humbel | H04L 63/0853 455/558 |
| 2013/0321178 | A1 * | 12/2013 | Jameel | H04W 4/40 340/989 |
| 2014/0309842 | A1 * | 10/2014 | Jefferies | B60R 25/2018 701/31.5 |
| 2016/0140649 | A1 * | 5/2016 | Kleve | H04W 12/06 705/307 |
| 2018/0225749 | A1 * | 8/2018 | Shoen | G06Q 20/4014 |
| 2019/0012451 | A1 * | 1/2019 | Cornick | G07B 15/00 |
| 2020/0349786 | A1 * | 11/2020 | Ho | G06V 40/172 |
| 2021/0035446 | A1 * | 2/2021 | Kim | G06Q 20/401 |
| 2023/0162548 | A1 * | 5/2023 | Ruffkess | G01K 1/024 70/263 |
| 2024/0086982 | A1 * | 3/2024 | Rosas-Maxemin | G06N 20/20 |

FOREIGN PATENT DOCUMENTS

| | | | | |
|---|---|---|---|---|
| CN | 104732804 | A * | 6/2015 | |
| FR | 2989650 | A1 * | 10/2013 | B60R 7/087 |
| JP | 2023173267 | A * | 12/2013 | |
| JP | 7447978 | B2 * | 3/2024 | G06F 21/32 |
| KR | 101975961 | B1 * | 5/2019 | G07C 9/00103 |
| KR | 102186339 | B1 * | 12/2020 | G06Q 30/0645 |
| WO | WO-2005114594 | A1 * | 12/2005 | G06F 21/35 |
| WO | WO-2007050204 | A3 * | 12/2007 | G08G 1/205 |
| WO | WO-2014012998 | A1 * | 1/2014 | G06Q 30/0283 |
| WO | WO-2014124529 | A1 * | 8/2014 | G06Q 10/06 |

OTHER PUBLICATIONS

S. Kennedy, "Charting a Course During COVID-19," Motor, vol. 234, (4), pp. 18-25, 2020 (Year: 2020).*

Turo "Turo Go Unlock cars from the Turo app _ Turo car sharing marketplace" Oct. 1, 2020, https://web.archive.org/web/20201001160147/https://explore.turo.com/turo-go/ (Year: 2020).*

DoorDeck "Smart Parking Garage Integrations" Sep. 18, 2020, https://web.archive.org/web/20200919024910/https://doordeck.com/product-integrations/smart-parking (Year: 2020).*

* cited by examiner

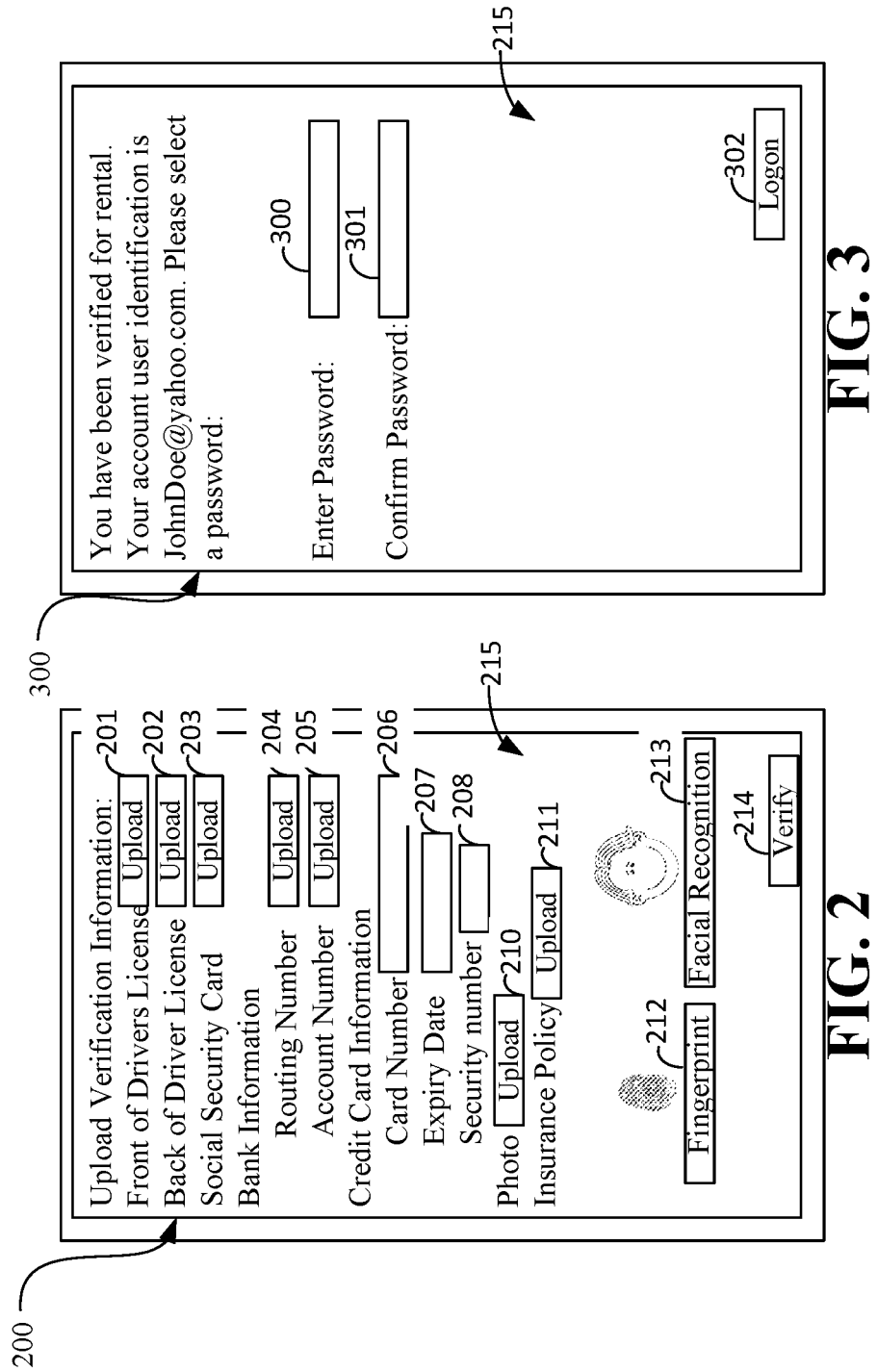

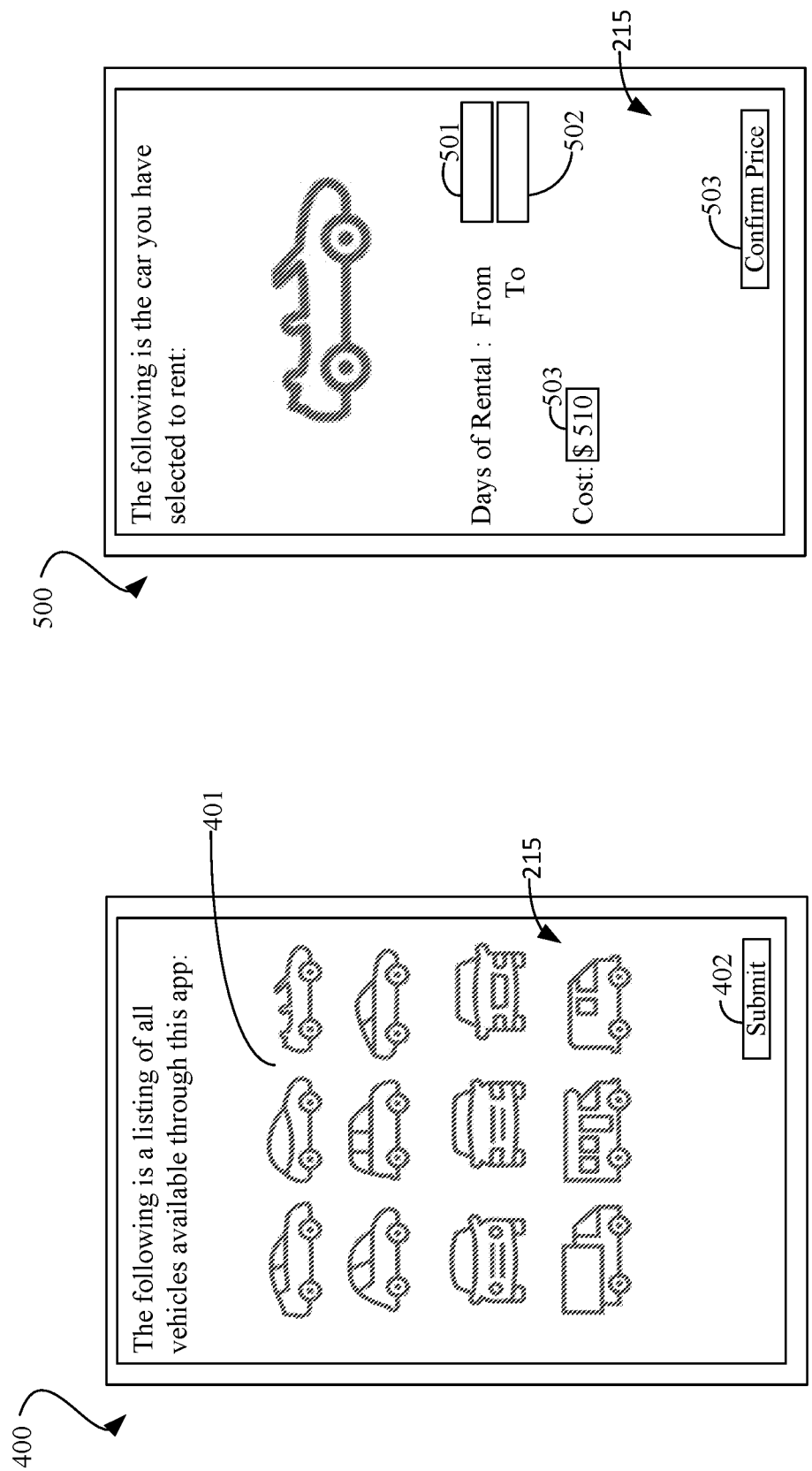

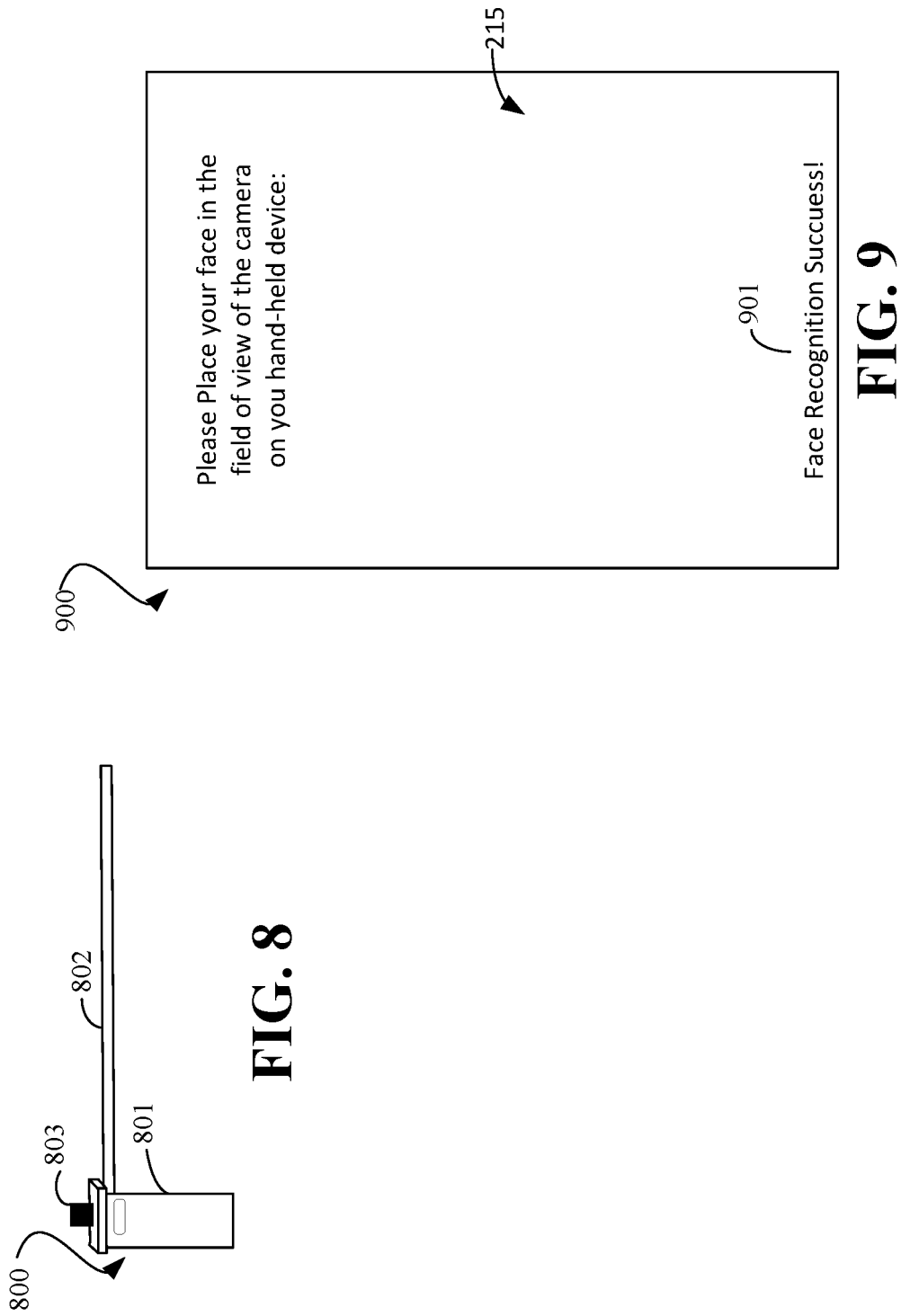

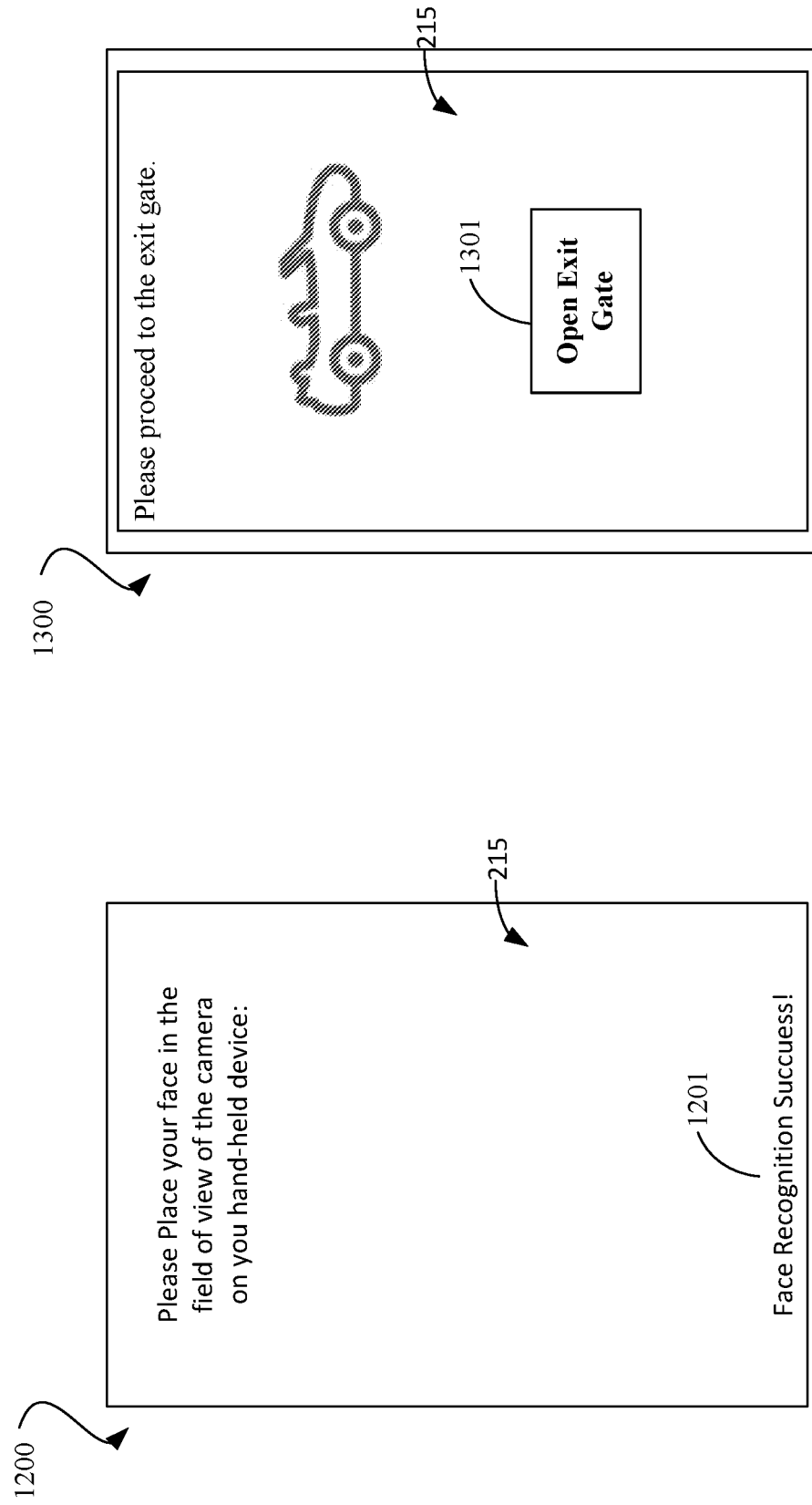

AUTOMATED RENTAL SYSTEMS AND METHODS

BACKGROUND

People often rent vehicles for a variety reasons. For example, the person's car may be in the shop getting repair work done. In such a scenario, the person needs a means of transportation until the person's car is finished being repaired. In another scenario, the person may be taking a long trip, and he does not desire to put the miles on his/her vehicle, so the person rents a car.

To rent a car, the person typically calls the rental company, e.g., Hertz, Avis, etc., ahead of time and makes a reservation. As individuals have experienced, this does not necessarily mean the rental company will have the vehicle you indicated to them on the phone call you wanted to rent.

When the person goes to pick up the rental vehicle, he/she must give the rental company personal information before renting the vehicle. For example, the person must give the rental company your name, your address, a copy of your driver's license, a copy of your insurance, and a credit card to have on file, even if you are not paying with a credit card.

After you have given all the information to the rental agent at the desk, it is time to take custody of the rental car. As indicated hereinabove, the person may or may not get the car you reserved. Further, it typically takes the rental agent time to get the person his/her rental vehicle.

DESCRIPTION OF THE DRAWINGS

The disclosure can be better understood referencing the following drawings. The elements of the drawings are not necessarily to scale relative to each other, emphasis instead being placed upon clearly illustrating the principles of the disclosure. Furthermore, like reference numerals designate corresponding parts throughout the views.

FIG. 2 is an exemplary graphical user interface (GUI) that displays to a handheld device for providing personal information to a rental car server such as is shown in FIG. 1.

FIG. 3 is an exemplary login GUI for creating a password for the system such as is shown in FIG. 1.

FIG. 4 is an exemplary GUI of the system of FIG. 1 that provides a user with the rentable vehicles in the rental company's fleet from which the user can select the vehicle he/she desires to rent.

FIG. 5 is an exemplary GUI of the system of FIG. 1 that shows the vehicle the user desires to rent and comprises input boxes for indicating a date range that the user will have the car, and the GUI further shows the cost.

FIG. 8 is an exemplary gate for protecting a fleet of vehicles of a rental company.

FIG. 9 is an exemplary GUI of the system of FIG. 1 for capturing the user's face.

FIG. 12 is an exemplary GUI of the system of FIG. 1 for capturing the user's face.

FIG. 13 is an exemplary GUI of the system of FIG. 1 that is displayed after the user's face is verified that comprises an "Open Exit Door" button.

DETAILED DESCRIPTION

The present disclosure is a system for automating the rental of a vehicle. The system comprises a handheld device, e.g., a cellular phone or a tablet, which is used by a renter. Further, the system comprises an entrance gate and/or exit gate that protects a fleet of vehicles. Further, the system has a key box that houses the keys to a vehicle, and the box locks the keys in the key box until a verified person is granted access to the key box.

The handheld device performs a variety of functions. First, the renter downloads a specific application from an application store that allows the automated rental of the vehicle. Further, through the downloaded application, the handheld device communicates with a rental car server. Also, the handheld device provides a graphical user interface (GUI) that enables the renter to enter driver's license information, e.g., an image of the renter's driver's license, social security information, bank information and/or credit card information. In addition, the handheld device provides an upload of an image of the renter renting the vehicle. The renter also uploads a copy of the renter's insurance police and an image of the user's fingerprint.

In one embodiment, an Available Vehicle GUI is displayed to the renter, and the renter selects which car he/she desires to rent and hits a submit button. Another Confirm Price GUI provides text fields in which the renter can provide a from date to a to date, i.e., the duration the car shall be rented. Once this information is entered, the car rental server determines the cost, transmits the cost to the handheld device, and the handheld device displays a confirmation price to the renter.

The system additionally provides the renter directions to the rental car facility. At a gate to the rental car facility, a camera, which may be coupled to the gate, obtains a picture of the renter's face and the car rental server compares picture to the face image entered when the car was rented online. The system comprises a "Get Keys" GUI and when the renter selects the "Get Keys" pushbutton on the handheld device, the handheld device transmits a signal to a receiver on the key box, which houses the keys. Upon receiving the signal, the box opens giving the renter access to the keys so that the user may have access to the rental car.

Figure 1:
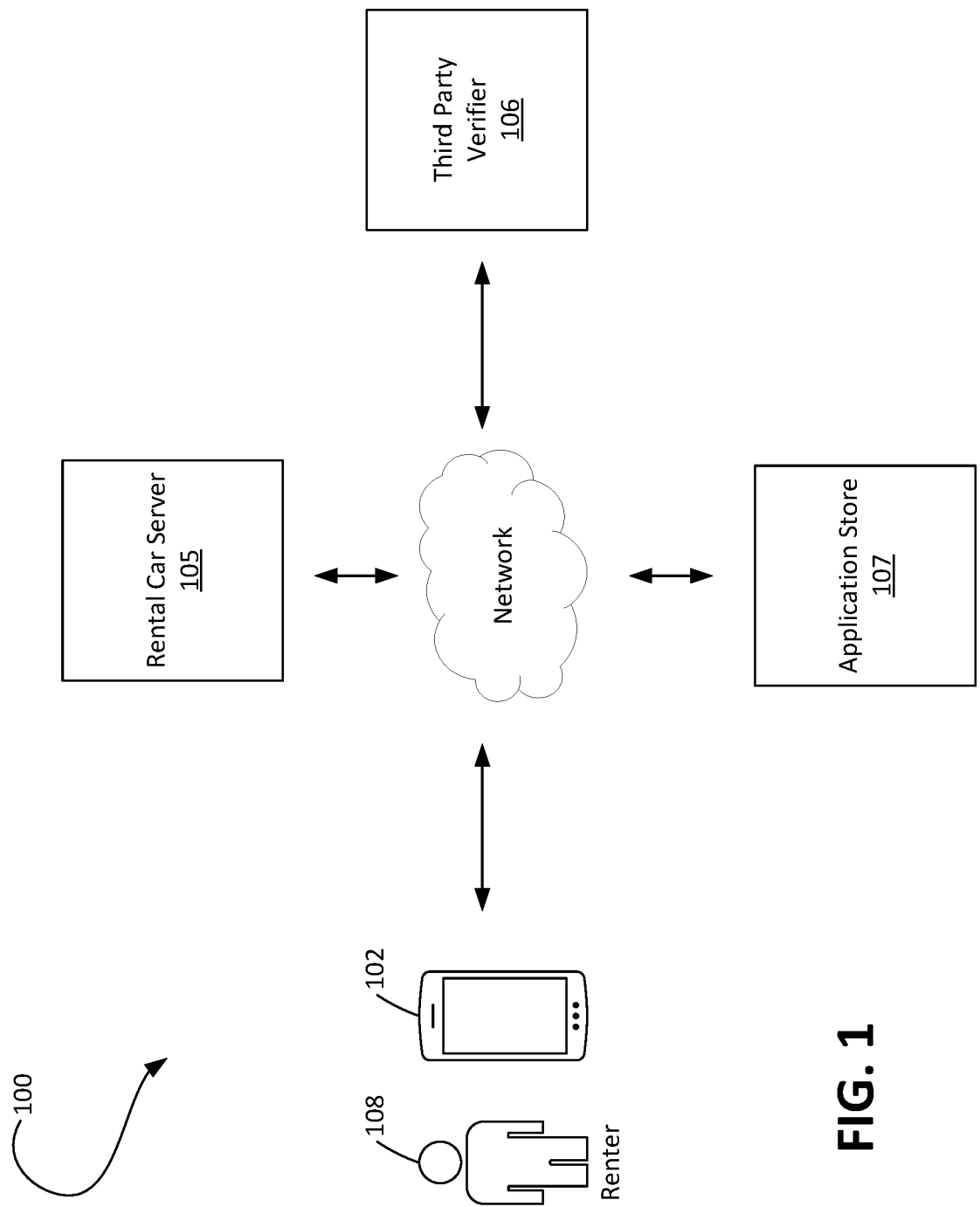
FIG. 1 is an exemplary automated rental system in accordance with an embodiment of the present disclosure.
Figure 7:
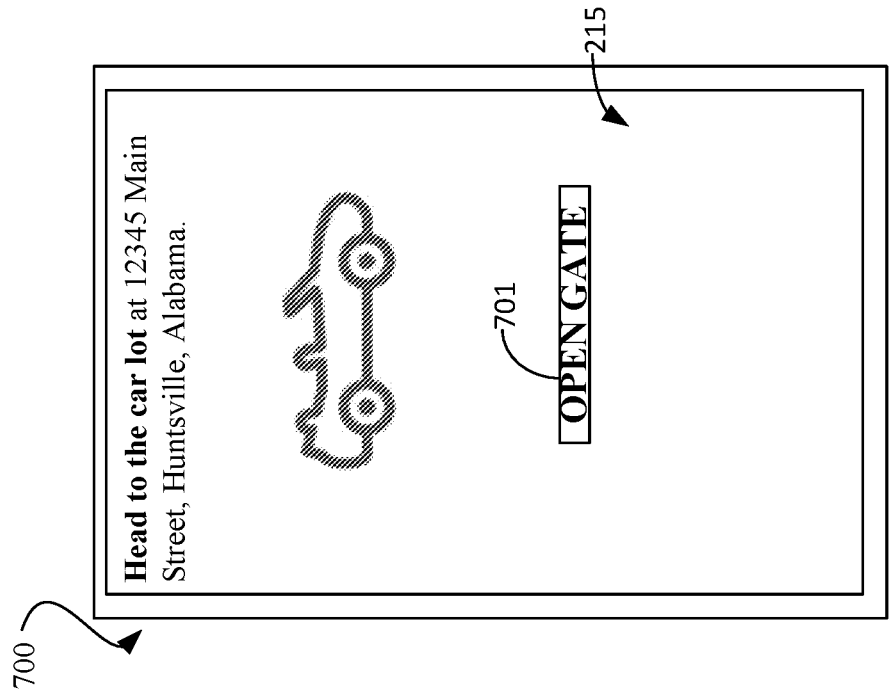
FIG. 7 is an exemplary GUI of the system of FIG. 1 that comprises a "Open Gate" button that when selected opens a gate.
Figure 6:
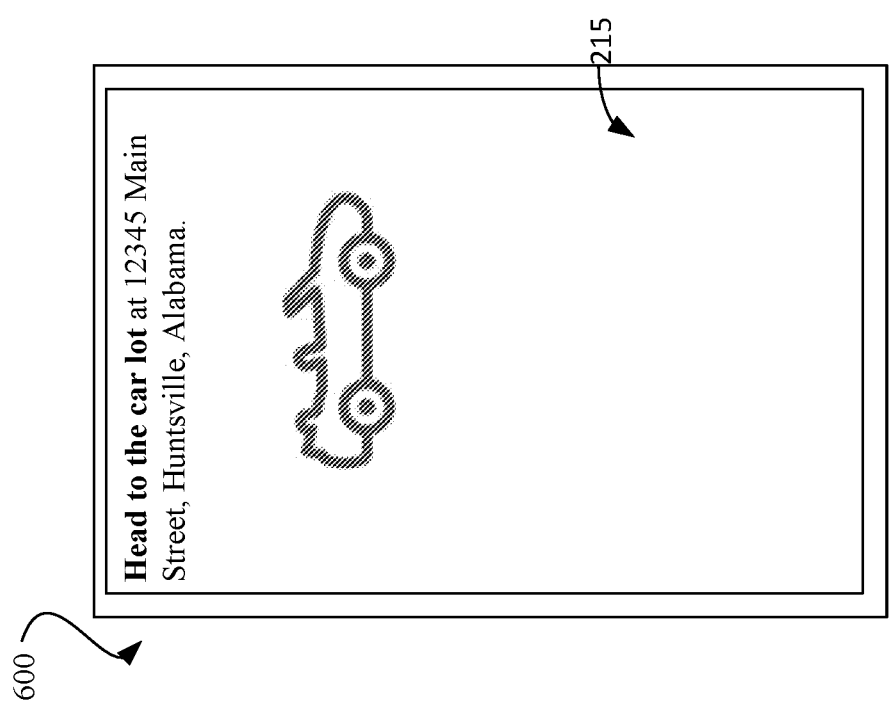
FIG. 6 is an exemplary GUI of the system of FIG. 1 that shows the vehicle the user is renting and instructs the user to "Head to the car lot" and provides an address.

FIG. 1 is an exemplary embodiment of an automated rental system 100 in accordance with the present disclosure. The automated rental system 100 comprises a handheld device 102, a rental car server 105, a third party verifier 105, and an application store 107.

The handheld device 102 communicates with the application store 107 over network 104. In this regard, when a renter 108 desires to download the automated rental car application, the renter 108 downloads the automated rental car application over the network 102, and the automated rental car application is stored on the handheld device 102.

Through the automated rental car application, the handheld device 102 communicates with the rental car server 105 via a network 104. In this regard, information entered in the automated rental car application is transmitted to the rental car server 104 over the network 104.

The third party verifier 106 communicates directly with or over a network with the rental car server 105. In this regard, the rental car server 105 transmits data indicative of the renter, e.g., date of birth, name, social security number, etc., and the third party verifier 106 verifies the renter 108.

FIG. 2 shows the display 215 of the handheld device 102 displaying a Main GUI 200. The handheld device 102 comprises a display 215 to which the GUIs of the present disclosure may be displayed. However, other types of input devices or computing devices may be used in other embodiments. The Main GUI 200 comprises text fields and upload buttons for obtaining information from the renter 108 (FIG. 1). The display 215 of the handheld device 102 displays the Main GUI 200 to the renter 108 using the handheld device 102.

In this regard, the Main GUI 200 comprises an upload button for the following: a) front of a driver's license upload button 201; back of a driver's license upload button 202; social security card upload button 203; bank information including, a routing number upload button 204 and an account number upload button 205; credit card information, including card number text field 206, expiry date upload text field, security number upload text field 208; photograph upload button 210; insurance policy upload button 211. In addition, the renter 108 may provide his/her fingerprint by selecting button 212 and a facial recognition button 213. When the information has been entered in the system via the text fields and pushbuttons, the user selects the verify pushbutton 214, which displays a GUI 300 described with reference to FIG. 3 and the handheld device 102 saves the information entered in the GUI 200.

FIG. 3 is a password GUI 300 displayed by the handheld device 102. The password GUI 300 provides two text boxes. The renter 108 (FIG. 1) enters his/her password in text box 300 and reenters the password again in text box 301. When the password has been entered and reentered, the user selects the Logon pushbutton 302.

Upon selection of the logon pushbutton 302, the display 215 of the handheld device 102 displays a Cars Available GUI 400 of FIG. 4. The display 215 of the handheld device 102 displays a plurality of vehicles 401 that are available for rent. From the variety of vehicles displayed, the renter selects which vehicle he/she desires to rent.

In one embodiment, the display 215 displays all the cars available for rent. In another embodiment, the renter 108 (FIG. 1) may scroll down or sideways to view additional cars for rent.

Once the renter 108 selects the vehicle 401 that he/she desires to rent, the renter hits the submit pushbutton 402. Upon selecting the submit pushbutton 402, the display 215 of the handheld device 102 displays the vehicle 504 the renter has selected in a rent GUI 500.

The rent GUI 500 comprises days of rental text fields, including a from text field 501 and a to text field 502. The renter enters in text field 501 when the renter desires to start renting the vehicle, and the renter enters in text field 502 when the renter will drop the vehicle off at the rental vehicle agency and stop renting the vehicle.

Once the renter enters data in the from text field 501 and the text field 502, the application in conjunction with the rental car server 105 (FIG. 1) determines a cost for the described rental and displays the cost in text field 503. If the renter agrees with the cost, the renter selects the confirm price pushbutton 503. Further, the rental car server 105 provides the handheld device 102 a key that indicates that the rental is verified.

In GUI 600, the application directs the renter to the rental car location. Once the renter 108 arrives at the rental car location, the display 215 displays the GUI 700, which comprises an open gate button 701. When the renter 108 selects the open gate button 701, the gate is ready to open.

FIG. 8 is a gate 800 in accordance with an embodiment of the present disclosure. The gate 800 comprises a housing 801 and an arm 802 that prevents vehicles from entering the rental car location. The gate 800 comprises a controller 803. In one embodiment, the controller 803 comprises a camera for taking pictures of the renter 108.

In another embodiment shown in FIG. 9, the display 215 of the handheld device 102 captures a picture of the renter 108. Data indicative of this picture is transmitted to the controller 803. The controller 803 comprises the image the renter 108 sent when he rented the car, so the controller 803 can compare the picture taken to the image to verify the renter 108.

Figure 10:
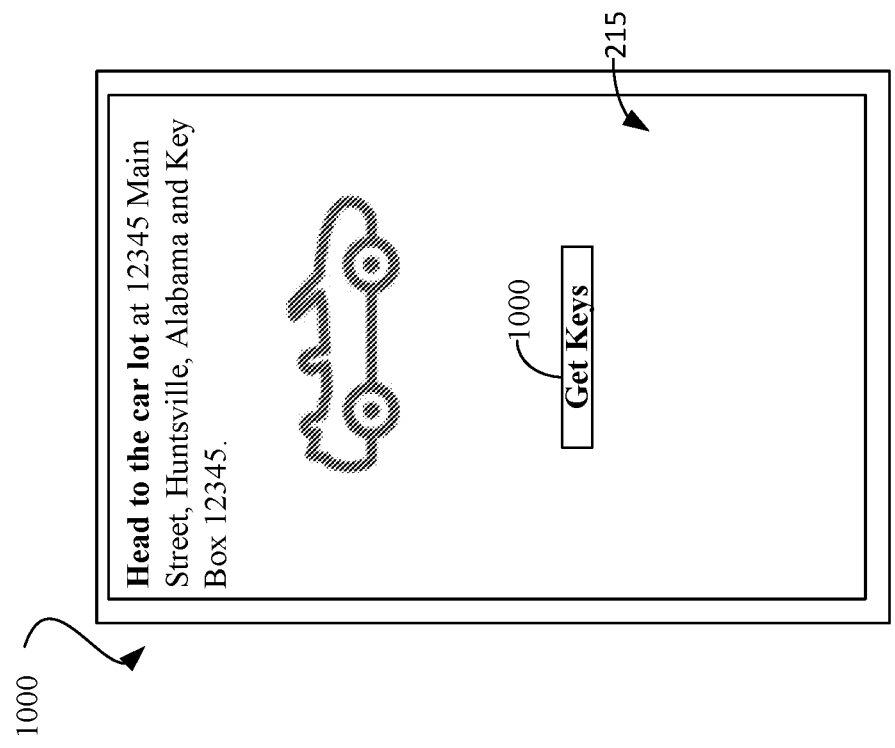
FIG. 10 is an exemplary GUI of the system of FIG. 1 that comprises a "Get Keys" button that when selected opens a key box.

Once face recognition is a success as indicated by text message 901, the display 215 of the handheld device 102 displays the GUI 1000 shown in FIG. 10. GUI 1000 indicates the number of the key box 1001. The renter 108 goes to the correct key box and select the get keys pushbutton 1003.

Figure 11:
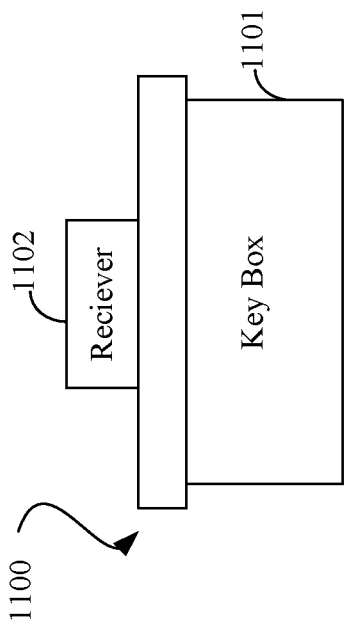
FIG. 11 is an exemplary key box of the system of FIG. 1 that protects the keys until a user is verified to obtain the keys from the key box.

FIG. 11 is a key box 1100 in accordance with an embodiment of the present disclosure. The key box 1100 comprises a housing 1101 for housing keys to the vehicle the renter 108 rented. Coupled to the key box is a receiver 1102.

When the renter 108 selects the get keys pushbutton 1003, the application executing on the handheld device 102 transmits a signal to the receiver 1102. The receiver 1102 recognizes the signal as valid and opens the key box 1100 so that the renter 108 can get the keys to the vehicle the renter 108 has renter.

Once the renter 108 is driving the vehicle he/she has rented, the renter 108 must exit the rental car location. In GUI 1200 shown in FIG. 12, the renter 108 again takes a picture of his face with the application running on the handheld 102. The picture is transmitted to the controller 803 (FIG. 8) of the gate 800 (FIG. 8). The controller 803 compares the picture to the image captured when the renter 108 rented the car. If facial recognition is a success as indicated by text 1201, the GUI 1300 of FIG. 13 is displayed to the display 125 of the handheld device 102. The renter 108 selects the open exit gate pushbutton 1301, the gate 800 opens, and the renter 108 leaves with the rental car.

Figure 14:
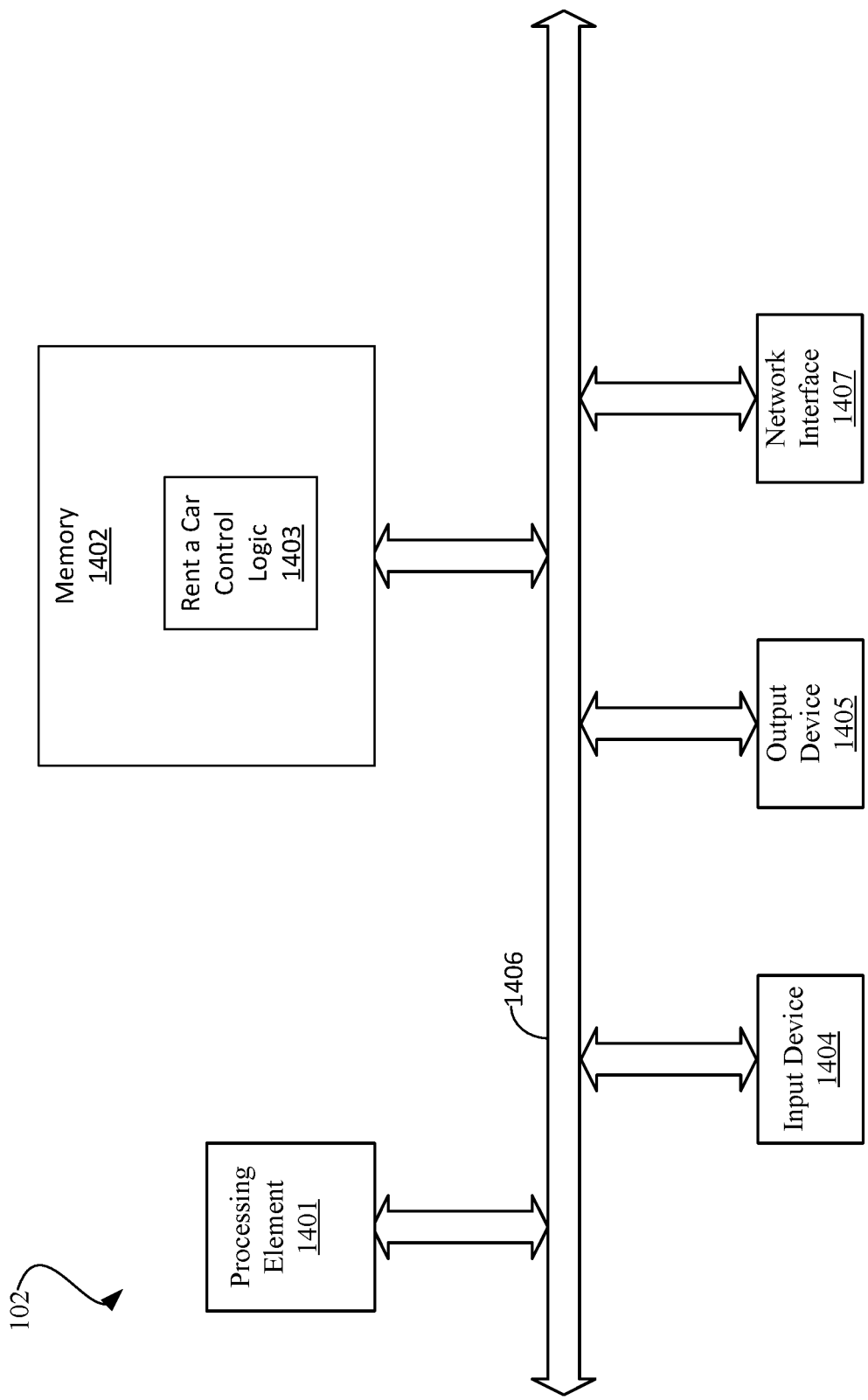
FIG. 14 is a block diagram of an exemplary handheld used in the system such as is shown in FIG. 1.

FIG. 14 is block diagram of an exemplary embodiment of the handheld device 102 depicted in FIG. 1. As shown by FIG. 14, the handheld device 102 comprises at least a processing unit 1401, a network interface 1407, an input device 1404, an output device 1405, and memory 1402. Stored in memory 1402 is rent a car control logic 1403. The rent a car control logic 1403 may be software, hardware, firmware, or a combination thereof.

The exemplary embodiment of the handheld device 102 depicted by FIG. 14 comprises at least one conventional processing unit 1401, such as a Digital Signal Processor (DSP) or a Central Processing Unit (CPU), that communicates to and drives the other elements within the handheld device 102 via a local interface 1406, which can include at least one bus. Further, the processing unit 1401 is configured to execute instructions of software, such as the rent a car control logic 1403.

The rent a car control logic 306 controls the functionality of the handheld device 102, and the present disclosure will describe in more detail hereafter. As noted above, the rent a car control logic 1403 can be implemented in software, hardware, firmware, or any combination thereof. In an exemplary embodiment illustrated in FIG. 14, the rent a car control logic 1403 is implemented in software and stored in memory 1402.

Note that the rent a car control logic 1403, when implemented in software, can be stored, and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The input device 1404 may be, for example, a touch screen, a keyboard, or a microphone. The renter 108 (FIG. 1) uses one or more of the input devices 1404 to input data into the handheld device 102. In this regard, the user may use the touch screen, the keyboard or microphone to enter data for renting a car. Also, the input device 1404 may be a camera (not shown) that receives images, e.g., a photograph of the user 108.

The output device 1405, for example, a display device (e.g., a Liquid Crystal Display (LCD)), outputs data to the user 108 (FIG. 1) of the handheld device 102. In this regard, the rent a car control logic 1406 may display to the user GUIs configured to receive information from the renter 108 and give directions to the user 108.

In addition, the network interface 1407, such as a Network Interface Card (NIC), enables the handheld device 102 to communicate via the network 101 (FIG. 1) with the server 105 (FIG. 1).

In operation, the rent a car control logic 1403 displays a graphical user interface (GUI) to the output device 1405. The GUI comprises input icons (not shown) that receive data from the renter 108 defining the renter 108. Once the user enters this information, the rent a car control logic 1403 transmits data indicative of the user to the server 105 (FIG. 1).

Upon receipt, the server 105 verifies the renter 108 with the third party verifier 106. This verification ensures that the renter 108 meets the minimum criteria to rent a vehicle.

Figure 15:
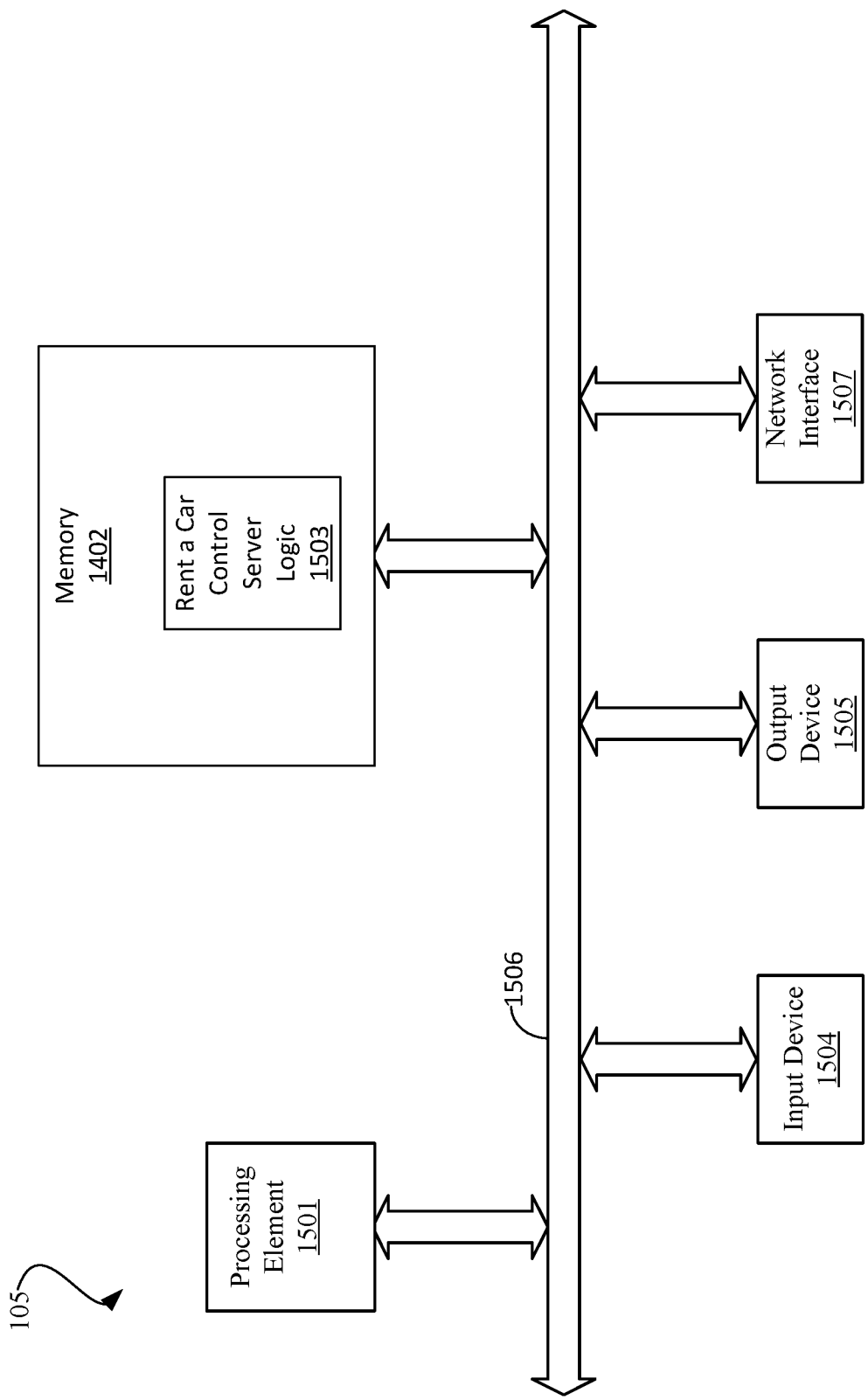
FIG. 15 is a block diagram of an exemplary rent a car control server such as is shown in FIG. 1.

FIG. 15 is block diagram of an exemplary embodiment of the rental car server 105 depicted in FIG. 1. As shown by FIG. 15, the rental car server 105 comprises at least a processing unit 1501, a network interface 1507, an input device 1504, an output device 1505, and memory 1502. Stored in memory 1502 is rent a car control server logic 1503. The rent a car server control logic 1503 may be software, hardware, firmware, or a combination thereof.

The exemplary embodiment of the rental car server 105 depicted by FIG. 15 comprises at least one conventional processing unit 1501, such as a Digital Signal Processor (DSP) or a Central Processing Unit (CPU), that communicates to and drives the other elements within the rental car server 105 via a local interface 1506, which can include at least one bus. Further, the processing unit 1501 is configured to execute instructions of software, such as the rent a car server control logic 1503.

The rent a car server control logic 1503 controls the functionality of the rental car server 105, and the present disclosure will describe in more detail hereafter. As noted above, the rent a car server control logic 1503 can be implemented in software, hardware, firmware, or any combination thereof. In an exemplary embodiment illustrated in FIG. 15, the rent a car server control logic 1503 is implemented in software and stored in memory 1502.

Note that the rent a car server control logic 1503, when implemented in software, can be stored, and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The input device 1504 may be, for example, a touch screen, a keyboard, or a microphone. An administrator (not shown) uses one or more of the input devices 1504 to input data into the rental car server 105. In this regard, the administrator may use the touch screen, the keyboard or microphone to enter data for setting up the system 100 or for modifying the system 100. Also, the input device 1504 may be a camera (not shown) that receives images.

The output device 1505, for example, a display device (e.g., a Liquid Crystal Display (LCD)), outputs data to the administrator of the rental car server 105. In this regard, the rent a car server control logic 1506 may display to the administrator GUIs configured to receive information for administering the rental car server 105.

In addition, the network interface 1507, such as a Network Interface Card (NIC), enables the rental car server 105 to communicate via the network 101 (FIG. 1) with the handheld device 102 (FIG. 1) and the third party verifier 106 (FIG. 1).

In operation, the rent a car server control logic 1503 receives data indicative of a renter 108 (FIG. 1). The rent a car server control logic 1503 transmits the data indicative of the renter 108 to the third party verifier 106. The third party verifier 106 reviews and confirms the renter's information and intentions and thus ensures accuracy. The third party verifier 106 transmits data to the rental car server 105 indicating whether the renter 108 is a valid renter 108.

Figure 16:
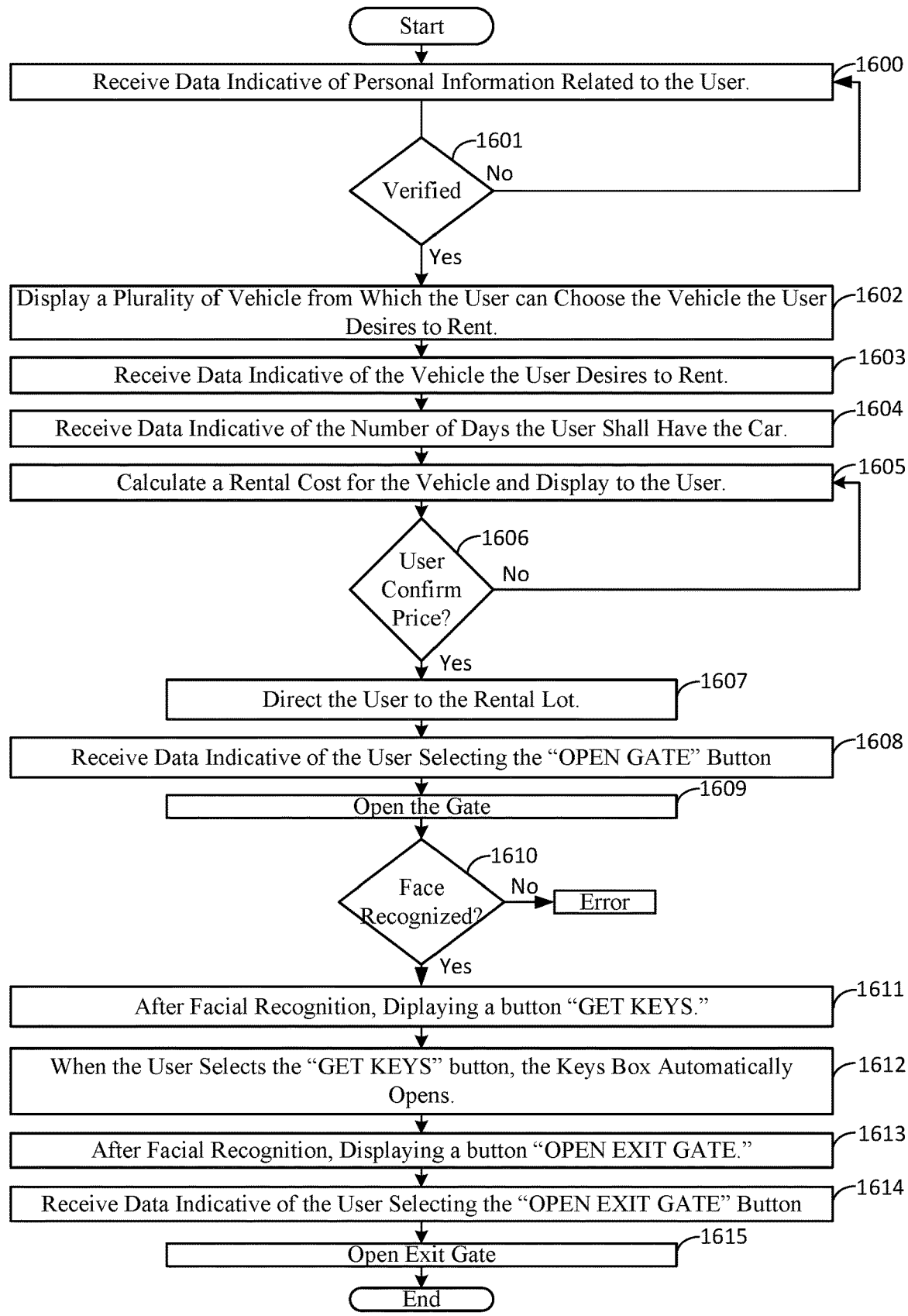
FIG. 16 is a flowchart of exemplary architecture and functionality of the system such as is shown in FIG. 1.

FIG. 16 is a flowchart of exemplary architecture and functionality of the automated rental system 100.

In step 1600, the rent a car server control logic 1503 (FIG. 15) receives a plurality of information about a potential renter 108 (FIG. 1). This information may be provided by a handheld device 102 (FIG. 1) over a network 104 (FIG. 1). While a handheld device 102 is shown, it can be any type of computing device known in the art capable of transmitting data to the server 105.

In response to receiving the data, the rent a car server control logic 1503 transmits the data to the third part verifier 106 (FIG. 1). If the renter 108 is verified in step 1601, the rent a car server control logic 1503 display a plurality of vehicles from which the renter can choose the vehicle the renter 108 desires to rent in step 1602.

In step 1603, the rent a car server control logic 1503 receives a vehicle choice from the renter 108 via the handheld device 102. In addition, the rent a car server control logic 1503 receives data indicative of the duration of the rental time in step 1604.

In step 1605, the rent a car server control logic 1503 calculates a rental cost for the chosen vehicle for the duration of time and displays this value to the renter 108 via the handheld device 102.

If the renter 108 does not confirm the price in step 1606, the rent a car server control logic 1503 continues at step 1605. If the renter 108 confirms the price, the rent a car server control logic 1503 directs the renter 108 to the car rental location in step 1607 where the vehicle the renter 108 is renting is located.

In step 1608, the renter 108 selects the open gate button on his/her handheld device 102. If the user has been verified, the rent a car server control logic 1503 opens the gate to the car rental location in step 1609.

The rent a car server control logic 1503 directs the user to the key box (not shown) that houses the keys for the vehicle the renter 108 is renting. Using his/her handheld device 102, the renter 108 captures his image, which is transmitting to a receiver (not shown) locking the key box in step. If the captured image matches the picture captured during the rental process in step 1610, the rent a car server control logic 1503 displays a get keys pushbutton on the renter's handheld device 102 in step 1611.

When the renter 108 selects the get keys pushbutton, the key box opens. Thus, the renter 108 can retrieve the keys to the vehicle that he/she is renting in step 1612.

As the renter 108 is leaving the car rental location, at the gate, the renter 108 uses his/her handheld device 102 to capture his/her image. If the controller at the gate matches the image captured with the picture previously captured during rental of the vehicle, the rent a car server control logic 1503 displays an open exit gate button to the renter's handheld 102 in step 1613.

In one embodiment, in step 1614, the rent a car server control logic 1503 may also require additional data be entered by the renter 108 before exiting the rental car location.

In 1615, the rent a car server control logic 1503 opens the exit gate.

The invention claimed is:

1. An automated vehicle rental system, comprising:
   a handheld computing device comprising a camera;
   a vehicle rental server which receives, from the handheld device, a vehicle rental request and personal information, which includes at least a driver's license image of the renter, transmits the personal information to a third-party verifier to verify the renter, and transmits, in response to verifying the renter by the third-party verifier, instructions to the handheld device to direct the renter to a vehicle rental location having a gate;
   the gate opening in response to receiving an open gate signal from the handheld device;
   the vehicle rental server transmits instructions to the handheld device to direct the renter to a key lockbox, receives a first image of the renter captured by the handheld device's camera, compares the first image with the renter's driver's license, and, in response to the first image and renter's driver's license matching, displays a get keys GUI element on the handheld device to open the key lockbox;
   the key lockbox comprising a housing for housing keys and a receiver receiving, in response to selecting the get keys GUI element, a signal from the handheld device to open the key lockbox;
   the gate comprising a controller which receives a second image of the renter captured by the handheld device's camera, compares the second image with the renter's driver's license, and, in response to the second image and the renter's driver's license matching, the vehicle renter server displaying an open exit GUI element on the handheld device to open the gate.

2. The system of claim 1, wherein the personal information indicative of the renter comprises social security information, bank information and/or credit card information, a copy of the renter's insurance policy, and an image of the user's fingerprint.

3. The system of claim 1, wherein the handheld computing device is a laptop, a computer, a smartphone, or a tablet.

4. The system of claim 1, wherein a vehicle rental application is downloaded from an application store onto the handheld computing device.

5. The system of claim 1, wherein the vehicle rental server transmits a message to the handheld computing device that the renter has been verified for renting.

6. The system of claim 5, wherein the handheld computing device receives a password from the renter.

7. The system of claim 6, wherein the vehicle rental server receives a duration of rental from the renter via the handheld computing device.

8. The system of claim 7, wherein the vehicle rental server calculates a cost for the selected vehicle for the duration and display the cost to the renter via the handheld computing device.

9. The system of claim 8, wherein the vehicle rental server receives a price confirmation from the renter via the computing device.

10. The system of claim 1, wherein:
    the controller transmits to the vehicle rental server that the second image and the renter's driver's license matches; and
    in response, the vehicle rental server transmits a signal to the handheld computing device to display the open exit GUI element.

* * * * *